No. 796,853. PATENTED AUG. 8, 1905.
W. H. NICHOLS.
COMBINED FIXTURE SUPPORT AND CANOPY.
APPLICATION FILED JAN. 9, 1904.
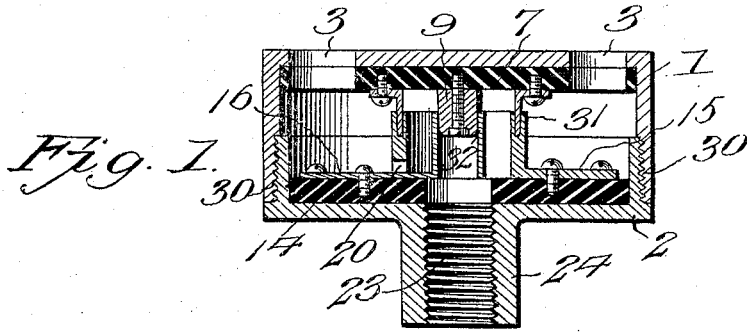
Fig. 1.
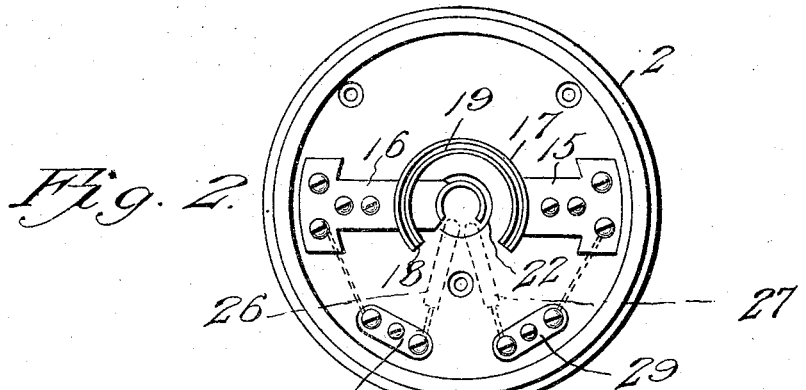
Fig. 2.
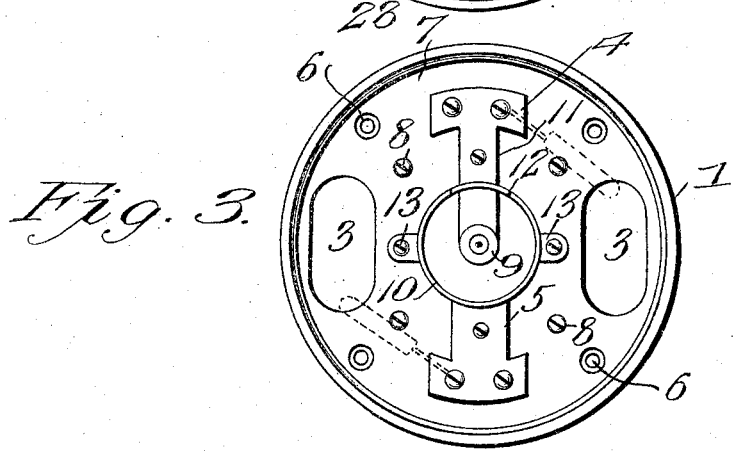
Fig. 3.
Fig. 4.
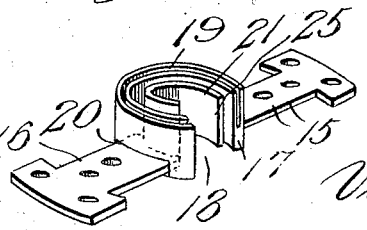
WITNESSES: INVENTOR
Wm. H. Nichols,
BY
Victor J. Evans
Attorney

UNITED STATES PATENT OFFICE.

WILLIAM H. NICHOLS, OF BENNINGTON, VERMONT, ASSIGNOR OF ONE-HALF TO ELMER ELLSWORTH LARRABEE, OF BENNINGTON, VERMONT.

COMBINED FIXTURE SUPPORT AND CANOPY.

No. 796,853.      Specification of Letters Patent.      Patented Aug. 8, 1905.

Application filed January 9, 1904. Serial No. 188,357.

*To all whom it may concern:*

Be it known that I, WILLIAM H. NICHOLS, a citizen of the United States, residing at Bennington, in the county of Bennington and State of Vermont, have invented new and useful Improvements in a Combined Fixture Support and Canopy, of which the following is a specification.

This invention relates to a combined fixture support and canopy for hanging electric, gas, and combination chandeliers and brackets and other kinds of lighting devices, and has reference particularly to that class of fixtures which are fastened to walls, ceilings, partitions, and floors or other supports. These devices usually consist of a tripod of metal with screw openings or holes therethrough for fastening to a wall or other support and a threaded opening to receive the fixture-stem, it being necessary to cover the tripod by a fixture-canopy of some kind. This usual manner of arranging fixtures of the class to which this invention pertains leaves the ends of the circuit-wires projecting through the wall or ceiling, &c., and therefore very likely to be cut or injured by a plasterer or other artisan about the building. The circuit-wires also have to be soldered to the fixture-wires after the walls or ceilings, &c., are finished, which is a hazardous operation, as the torch or iron used in soldering is very likely to set fire to the woodwork surrounding the opening left for the circuit-wires, or the finish adjacent to the fixture will become defaced by smoke. Furthermore, the circuit-wires are very likely to become crossed and if the insulation is injured may cause fire or other troubles. The fixture-wires are also often very badly twisted, more especially when the canopy cannot be moved far enough away from the wall, &c., to permit connection of said wires to the circuit-wires after the fixture is secured in place. This latter disadvantage is serious and causes fuses to blow, which in turn may cause fire to spread to the surrounding inflammable material.

The combined fixture support and canopy, embodying the features of the present invention, has been devised and designed to avoid the troubles and disadvantages heretofore noted and especially to minimize the fire risk. In new buildings under construction the support and canopy may be placed to come flush with the finished walls, ceilings, &c., and the circuit-wires immediately connected thereto, thus avoiding the wire ends hanging out in the way and making it practically impossible for such wires to be injured.

The invention embodies a cap which is fastened to the support and completely covers the outlet, the said cap being applied either while finishing the building or after the building is completed, and the walls, ceilings, &c., are finished. This cap may be of any suitable metal properly insulated and used either as a canopy for the fixture to conceal the circuit-wire ends or may be made of suitable size and shape to permit the use of the ordinary sliding canopy, furnishing the necessary support for the fixture and connections for the fixture-wires.

The improved support and canopy has in connection therewith fiber, porcelain, or other insulating material of any suitable shape corresponding to the fixture; but the latter is preferably of circular pattern in two parts, one, the base, which is hollow and provided with means for connecting the circuit-wires and also having members firmly attached thereto into which corresponding members in the other part or cap may be drawn, the two parts being preferably secured by screw-threads, and the assemblage of the two parts through the medium of the threads causing engagement of the electrical contacts between the fixture as an entirety and the circuit-wires. The cap is made to conform to the shape of the base, as set forth, and provided with suitable means for connecting the fixture-wires. Both parts are so proportioned and designed that they must be screwed together at least one full thread before the electrical connections can be completed between the circuit and fixture wires.

In the drawings, Figure 1 is a transverse vertical section through the improved device. Fig. 2 is a top plan view of the cap. Fig. 3 is a bottom plan view of the base. Fig. 4 is a detail perspective view of the connecting devices carried by the base.

Similar numerals of reference are employed to indicate corresponding parts in the several views.

The numeral 1 designates the base, and 2 the cap, the base having openings 3 therein for the circuit-wires and having electrical connections or metallic strips 4 and 5, to which the circuit-wires are attached, as indicated by dotted lines in Fig. 3. The base also has a number of openings 6 therein for the reception of fastening devices for securing said base to a wall, ceiling, &c. Within the base insulating material 7 is secured by means of screws or other fastenings 8, and on this insulating material are applied the electrical connections 4 and 5, as well as the electrical contact means or members, which will now be explained. Secured to the inner end of the connection 4 is a depending plug 9, which is concentric in relation to an annular contact 10, the latter contact being in engagement with the connection 5, and the arm 11 of the connection 4 passes diametrically under contact 10 through a slot 12 in the latter, as shown by Fig. 3 in dotted lines. Both contacts 9 and 10 are secured to the insulating material 7 by suitable screws, the contact 10 having diametrically-opposed ears 13 for convenience in fastening the same. The openings 3 in the base 1 are located on opposite sides of the center of the latter and are sufficiently large to permit the circuit-wires to be passed therethrough, the terminals of the circuit-wires being respectively attached to the outer ends of the connections 4 and 5.

The cap 2 has an insulating material 14 fastened thereto by suitable means, and projecting inwardly thereover at diametrically opposite points are electrical connections 15 and 16, the connection 15 being attached at its inner end to a curved contact 17, having a segmental opening 18 formed therein and also provided with an upper groove or slot 19. The contact 17 by reason of the formation of the groove 19 therein may be termed a "receptive" means for the contact 10, secured to the base. As clearly shown by Fig. 4, the contact 17 at a point directly opposite that to which the connection 15 is attached is formed with a slot 20, through which projects the inner end of the connection 16, and to the inner end of said latter connection a curved contact 21 is secured directly over and in line with a central opening or inlet 22 in the insulating material 14, said opening continuing into a screw-threaded bore 23, formed in a securing-neck 24. The contact 21 is disposed in concentric relation to the contact 17 and also has a segmental opening 25 in line with the opening 18 in the contact 19, the openings in the said contacts 17 and 21 permitting the fixture-wires 26 and 27 to be passed through said contacts and attached, respectively, to electrical connections in the form of oblong plates 28 and 29, secured on the insulating material at a suitable distance from the opening 22, the said plates being in turn attached to wires, as shown by dotted lines in Fig. 3, to the outer ends of connections 15 and 16. It will be understood that the fixture-wires 26 and 27 extend upwardly through the bore 23 in the neck 24.

The base and cap are connected by screw-threads 30, as clearly shown by Fig. 1, and the contacts are so positioned within the said base and cap that the annular contact 10 and plug 9 will respectively engage the contact 17 and contact 21, when the said base and cap are assembled, and at the same time the wire ends will be fully inclosed and protected. The upper end of the contact 17 is beveled inwardly, as at 31, in reverse directions toward the groove or slot 18, and the lower free end of the plug 9 at the corners is also beveled, as at 32. The purpose of these beveled constructions is to facilitate the entrance of the annular contact 10 and the plug 9, respectively, into the groove or slot 19 and the contact 21 without any tendency toward obstruction, and also to make a more perfect electrical connection. The plates 28 and 29 constitute fuse-plates; but it will be understood that the wires 26 and 27 may be attached directly to the outer ends of the connections 15 and 16.

The improved combined fixture support and canopy, as shown, is wired for use in a single circuit.

Having thus fully described the invention, what is claimed as new is—

1. In a device of the class set forth, the combination of a base, a contact-plug on said base, an annular contact surrounding said plug and being formed with a slot, an electrical connection passing through said slot and leading to said plug, an electrical connection leading to said annular contact, a cap detachably connected with the base and having an opening therein, a large annular contact on said cap, having two slots and a segmental opening therein, one of the slots being adapted to receive the annular contact and base, a small annular contact on the cap, having a segmental opening and being adapted to receive the plug on the base, an electrical connection passing through one of the slots in the large annular contact and leading to the small annular contact, and an electrical connection leading to the large annular contact.

2. The combination of a base, having openings therein, a contact-plug on said base, an annular contact surrounding said plug and being formed with a slot, an electrical connection passing through one of the openings in the base and through said slot and leading to said plug, an electrical connection leading through another opening in said base to said annular contact, a cap detachably connected with the base and having an opening therein, a large annular contact on said cap having two slots and a segmental opening therein, one of the slots being adapted to receive the annular contact on the base, a small annular contact surrounding the opening in the cap and having a segmental opening therein, said small annular contact being adapted to receive the plug on the base, an electrical connection passing through one of the slots in the large annular contact and leading to the small annular contact, an electrical connection leading to the large annular contact, and fuse-plates in said last-mentioned connection attached to said cap.

In testimony whereof I affix my signature in presence of two witnesses.

WILLIAM H. NICHOLS.

Witnesses:
  W. M. AIKEN,
  H. W. SMALL.